United States Patent [19]

Ueda

[11] Patent Number: 5,381,274
[45] Date of Patent: Jan. 10, 1995

[54] APPARATUS AND METHOD FOR RECYCLING AND REPRODUCING A DIGITAL VIDEO SIGNAL

[75] Inventor: Mamoru Ueda, Kanagawa, Japan

[73] Assignee: Sony Corporation, Tokyo, Japan

[21] Appl. No.: 35,701

[22] Filed: Mar. 23, 1993

[30] Foreign Application Priority Data

Mar. 26, 1992 [JP] Japan ................................. 4-068481

[51] Int. Cl.⁶ ........................... G11B 5/09; H04N 5/76
[52] U.S. Cl. ........................................ 360/48; 360/53; 358/335
[58] Field of Search .............................. 360/32, 48, 53; 358/133, 285, 335

[56] References Cited

U.S. PATENT DOCUMENTS

| | | | |
|---|---|---|---|
| 4,692,812 | 9/1987 | Hirahara et al. | 358/285 |
| 4,799,113 | 1/1989 | Maura Kami | 360/32 |
| 4,882,732 | 11/1989 | Kaminaga | 360/53 |
| 5,073,821 | 12/1991 | Juri | 350/133 |
| 5,223,991 | 6/1993 | Nagai et al. | 360/48 |

*Primary Examiner*—Donald Hajec
*Assistant Examiner*—Won Tac C. Kim
*Attorney, Agent, or Firm*—William S. Frommer; Alvin Sinderbrand

[57] ABSTRACT

An information data recording apparatus includes a DCT (discrete cosine transform) circuit (3) for processing a video signal in a DCT fashion, a quantizer (4) for quantizing an output signal of the DCT circuit (3), outer code circuits (5) and (10) for adding an error correction code to quantized data from the quantizer (4), and a recording head (13) for recording output data on a magnetic tape (14), whereby a high frequency component of data or outer code is recorded on first and last tracks of tracks of one field. Of the tracks constructing one field, a high frequency component of data or outer code that is less affected by a reproducing error is recorded on respective end tracks that have the large possibility that original recorded data will be broken by a mis-tracking upon editing. Therefore, even when an edit point is displaced by the mis-tracking upon editing so that the original recorded data is broken to cause an error to occur, an amount that a picture quality of a reproduced picture is deteriorated when the error occurs can be reduced considerably.

26 Claims, 7 Drawing Sheets

FIG. 7A
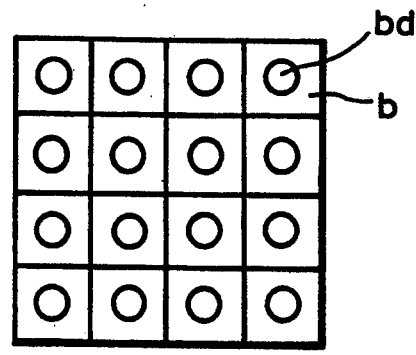
FIG. 7B
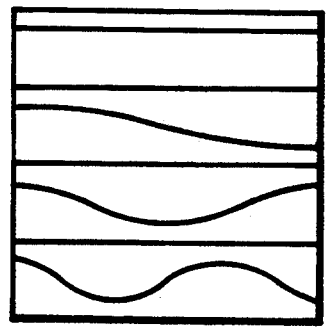
FIG. 7C
FIG. 7D  DC.AC1.AC2.AC3.AC4 ..... .AC14.AC15

APPARATUS AND METHOD FOR RECYCLING AND REPRODUCING A DIGITAL VIDEO SIGNAL

BACKGROUND OF THE INVENTION

1. Field of the Invention

The present invention relates to an information data recording apparatus for a video tape recorder (VTR) having a digital format or the like, for example.

2. Description of the Prior Art

In conventional digital video tape recorders, as U.S. Pat. No. 4,799,113 describes, an input analog video signal is converted into digital data and outer code data for error correction is added to the digital data. Then, the digital data added with the outer code data is shuffled, the shuffled digital data is multiplexed, inner code data for error correction is added to the digital data thus multiplexed and the digital data added with the inner code data is processed in a channel-coding fashion. Further, the digital data that was processed in a channel-coding fashion is amplified and then supplied to a recording rotary head such that the digital data is recorded by the recording rotary head so as to form oblique video tracks.

FIG. 1 of the accompanying drawings shows a digital video tape recorder (DVTR) tape format utilized when digital data is recorded in the digital VTR. As shown in FIG. 1, in the above digital VTR, video data of one field is recorded by six video tracks.

When video data recorded on a magnetic tape is reproduced, the magnetic tape is transported in the direction shown by an open arrow in FIG. 1 and a reproducing head is rotated in the direction shown by a solid arrow in FIG. 1. More specifically, as shown in FIG. 2, a magnetic tape 14 is transported from an entrance tape guide d1 to an exit tape guide d3 and a rotary drum d2 having a reproducing head 15 mounted thereon is rotated as shown by an arrow R1 in FIG. 2. Then, magnetic head 15 sequentially scans video tracks T1, T2, T3, T4, T5, T6 to reproduce recorded video data. Then, the reproduced data or signal is equalized and amplified. The reproduced signal thus amplified is decoded, de-shuffled and the reproduced signal thus de-shuffled is error-corrected. Then, the reproduced signal thus error-corrected is error-concealed and the reproduced signal thus error-concealed is output as a digital or analog video signal.

In the above digital VTR, as shown in FIG. 3, for example, when a field 2 shown hatched (corresponding to video tracks T21 to T26) of the recorded portion recorded over three fields is edited, if the tracking is displaced forwardly, then the first video track T21 of the field 2 overlaps the video track T16 of the field 1 that is not the target field as shown by a hatched portion in FIG. 4. As a result, recorded data on the video track T16 is destroyed so that, upon playback, a signal on the video track T16 becomes erroneous.

Conversely, as shown in FIG. 5, when the field 2 shown hatched (corresponding to the video tracks T21 to T26) of the recorded portion recorded over three fields is edited, if the tracking is displaced backwardly, the last video track T26 of the field 2 overlaps a video track T31 of a field 3 that is not the target field as shown by a hatched portion. Consequently, recorded data on the video track T31 is destroyed so that, upon playback, a signal on the video track T31 becomes erroneous.

As described above, in the digital VTR in which data of one field is separated into a plurality of narrow video tracks and then recorded, if a mis-tracking occurs upon editing, data on the video track just ahead of or behind the edit point is destroyed and an error occurs. There is then the disadvantage that a reproduced picture will be deteriorated.

OBJECTS AND SUMMARY OF THE INVENTION

Therefore, it is an object of the present invention to provide improved method and apparatus for recording information in which the aforesaid shortcomings and disadvantages encountered with the prior art can be eliminated.

More specifically, it is an object of the present invention to provide method and apparatus for recording information data in which when all edit point is displaced by a mis-tracking upon editing to cause an error, an amount that a picture quality of a reproduced picture is deteriorated when the error occurs can be reduced considerably.

According to a first aspect of the present invention, there is provided a method for recording digital video data on a magnetic tape by forming a plurality of video tracks per each video field thereon. This method comprises the steps of receiving the digital video data and storing the same, orthogonal transforming the digital video data, quantizing the orthogonal transformed digital video data, adding an outer error code to the quantized digital video data, rearranging an order of the outer error code and quantized digital video data for recording so that a high frequency component of the quantized digital video data is recorded at beginning and ending track portions of the plurality of video tracks, and remaining quantized digital video data is recorded at a remaining portion of the plurality of video tracks.

According to a second aspect of the present invention, there is provided an apparatus for recording a digital signal on a magnetic tape by forming a plurality of tracks per one unit of the digital signal. This apparatus comprises a circuit for receiving and storing the digital signal, a circuit connected to the receiving and storing circuit for orthogonal transforming the digital signal, a circuit connected to the orthogonal transforming circuit for quantizing an output signal of the orthogonal transforming circuit, a circuit for adding an error code signal to an output signal of the quantizing circuit, and a circuit for rearranging an order of the error code signal and quantized digital signal for recording so that a high frequency component of the quantized digital signal is recorded at first and last tracks of the plurality of tracks, and a remaining quantized digital signal is recorded at remaining tracks between the first and last tracks.

In accordance with a third aspect of the present invention, there is provided an apparatus for recording and reproducing a digital signal on and from a magnetic tape. This apparatus comprises a circuit for receiving and storing the digital signal, a circuit connected to the receiving and storing circuit for orthogonal transforming the digital signal, a circuit connected to the orthogonal transforming circuit for quantizing an output signal of the orthogonal transforming circuit, a circuit for adding an error code signal to an output signal of the quantizing circuit, a circuit for rearranging an order of the error code signal and quantized digital signal for recording so that a high frequency component of the quantized digital signal is recorded at first and last tracks of the plurality of tracks, and a remaining quantized digital signal is recorded at remaining tracks between the first and last tracks, a circuit for reproducing a digital signal recorded on the magnetic tape, a circuit for equalizing a waveform of the reproduced digital signal, a circuit for reproducing a clock signal on the basis of the reproducing digital signal from the equalizing circuit, a circuit for converting the reproduced signal from the reproducing circuit in the forth of one-bit serial data to 8-bit parallel data, a circuit for correcting a random error of the 8-bit parallel data, an identification code decoding circuit for decoding an identification code and generating an address signal on the basis of the decoded identification code, a circuit for receiving and storing the quantized digital signal and the error code signal, a circuit for correcting a burst error of the quantized digital signal by using the error code signal, a circuit connected to the correcting circuit for inverse-orthogonal transforming the quantized digital signal, an error correcting circuit for correcting an error of an output signal from the inverse-orthogonal transforming circuit so that the error-corrected output signal is displayed as a reproduced picture.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 7A through 7D are diagrams showing a discrete cosine transform, and to which references will be made in explaining an operation of an embodiment of the present invention;

DETAILED DESCRIPTION OF THE PREFERRED EMBODIMENTS

An information data recording apparatus according to an embodiment of the present invention will hereinafter be described with reference to FIG. 6.

Figure 1:
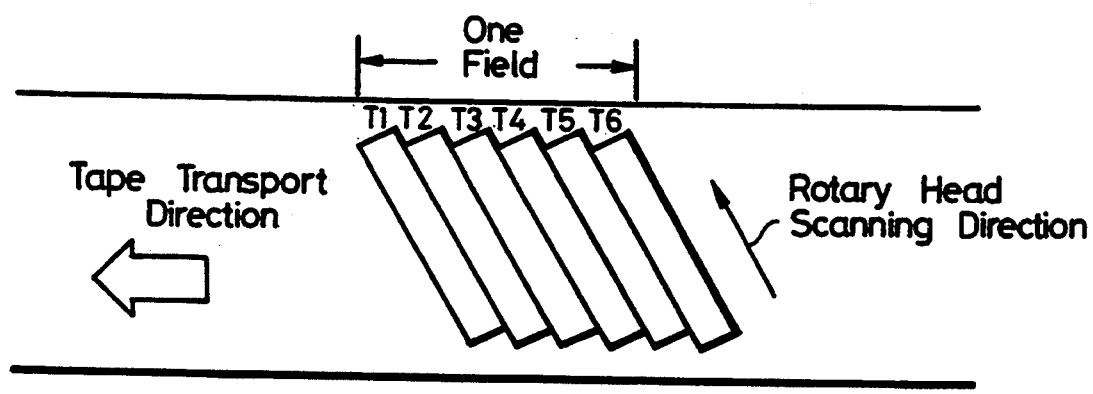
FIG. 1 is a diagram showing a tape format of a prior art digital video tape recorder (DVTR)
Figure 2:
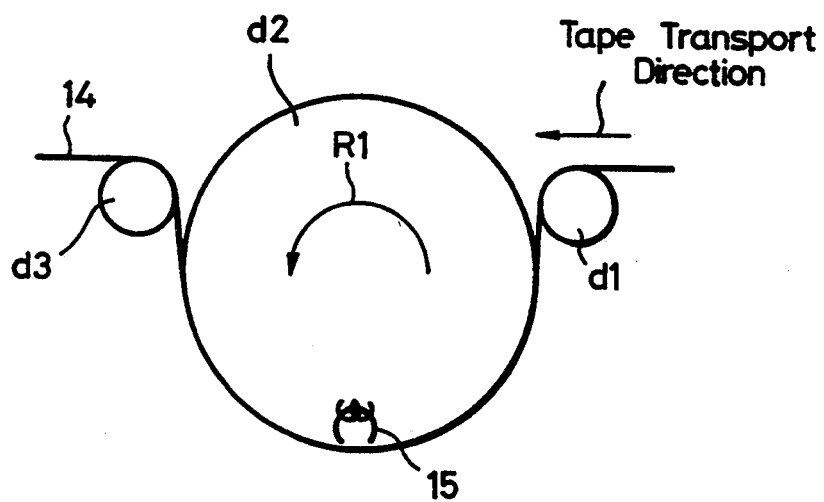
FIG. 2 is a diagram showing a tape and a rotary head assembly of the prior art digital video tape recorder, and to which references will be made in explaining the condition that recorded video data is reproduced by a reproducing head from a magnetic tape.
Figure 3:
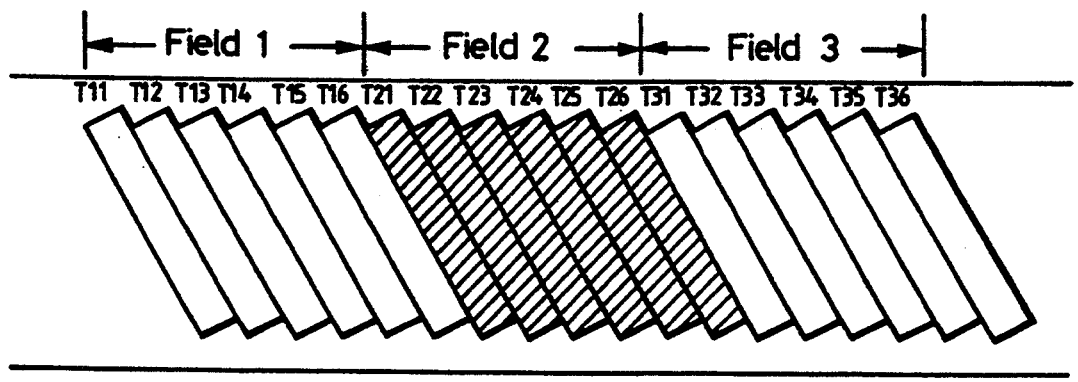
FIG. 3 is a diagram used to explain the condition that data of one field is edited.
Figure 4:
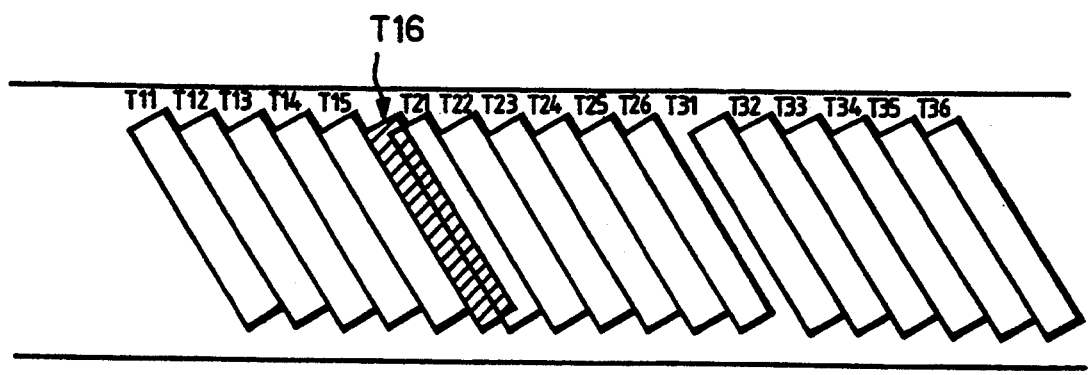
FIG. 4 is a diagram used to explain the condition that a tracking is displaced in the forward direction when data of one field is edited.
Figure 5:
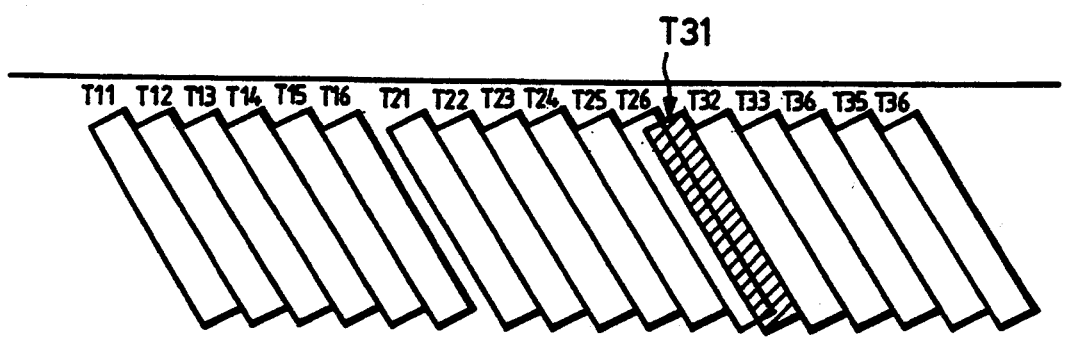
FIG. 5 is a diagram used to explain the condition that a tracking is displaced in the backward direction when data of one field is edited.
Figure 6:
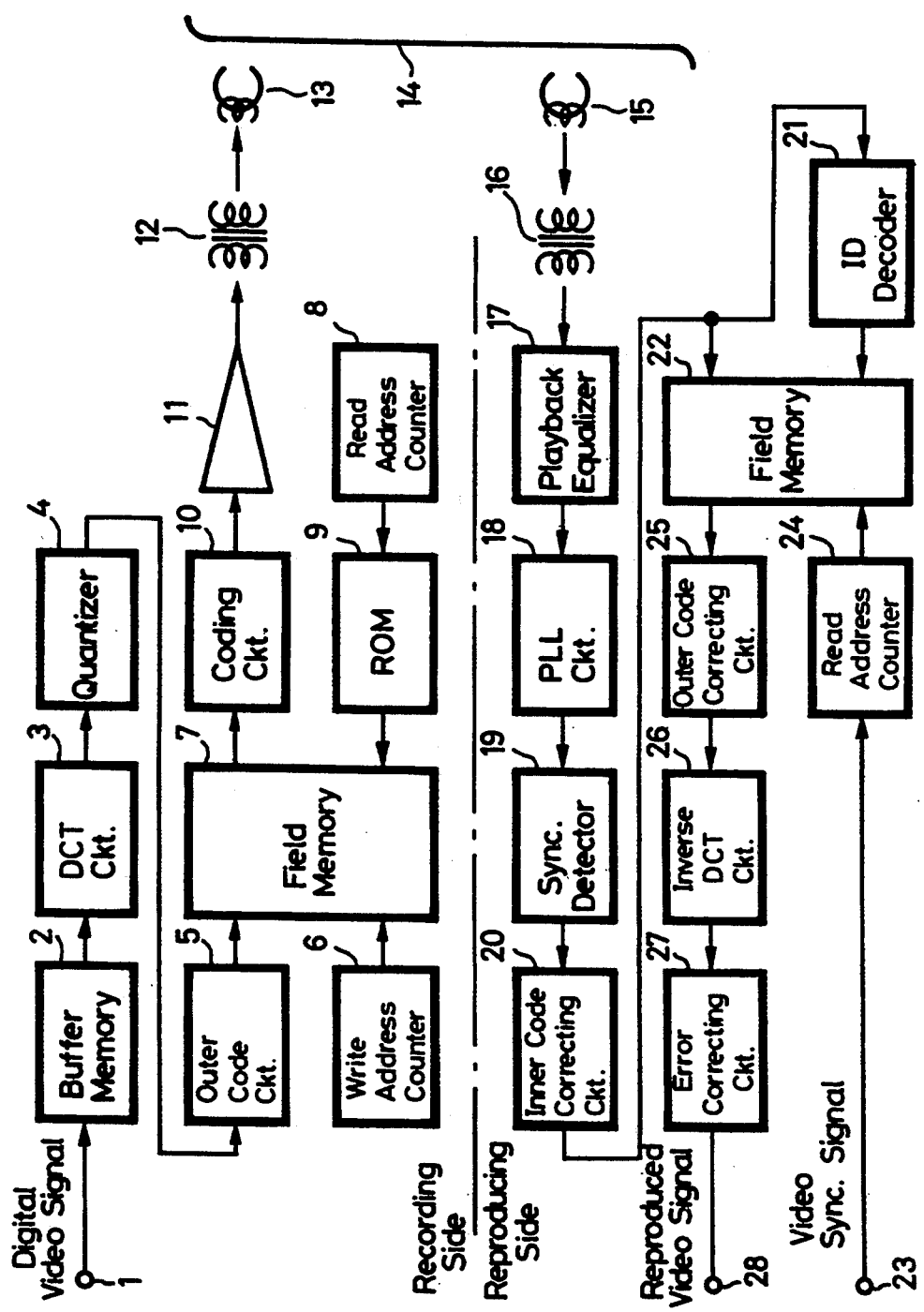
FIG. 6 is a block diagram showing an information data recording apparatus according to an embodiment of the present invention.

As shown in FIG. 6, there is provided an input terminal 1 to which a digital video signal is input. The digital video signal applied to the input terminal 1 is stored in a buffer memory 2 and then read out therefrom by a DCT (discrete cosine transform) circuit 3 at the block unit of 4 rows×4 columns, for example, thereby converted into spatial frequency data. The spatial frequency data, i.e., transform coefficient, is supplied to a quantizer 4 and quantized by the quantizer 4.

The discrete cosine transform and the quantization obtained by the discrete cosine transform will be described. The discrete cosine transform is one of band compression systems that are very useful for a video signal. The discrete cosine transform makers effective use of a correlation of video signal, in which an amount of recording information is reduced by the band compression and a recording time of a magnetic tape can be extended.

As shown in FIG. 7A, the digital video signal, temporarily stored in the buffer memory 2 is read out therefrom at the unit of block b composed of block data bd of 4 rows×4 columns and the block b is processed in a cosine transform fashion. As shown in FIG. 7B, a cosine wave whose frequency is increased at an interval of 0.5 cycle from zero cycle is sampled at a plurality of sampling points to thereby sequentially calculate a discrete cosine transform matrix in the horizontal and vertical directions. Thus, there is obtained two-dimensional spatial frequency data, i.e., transform coefficient F (u, v).

The transform coefficient thus obtained by the discrete cosine transform is quantized by the quantizer 4 shown in FIG. 6. This quantizer 4 quantizes a transform coefficient (direct current component) DC and transform coefficients (alternate current components) AC1, AC2, AC3, . . . , AC15 from low to high band sequentially in a zigzag scan fashion as shown by dashed lines in FIG. 7C to thereby convert the same into codes as shown in FIG. 7D. At that time, by making effective use of characteristics of image data, i.e., characteristics that the level of a high frequency component of data is small as compared with that of a low frequency component of data and that a fluctuation of a high frequency component of data cannot be visually confirmed without difficulty, the quantization level is made coarse from low to high band to reduce an information amount, thereby effecting the band compression. Generally, there is determined a quantized coefficient region that is to be coded. Then, only the region of the transform coefficient thus quantized is coded and transmitted to a transmission line or storage system.

Referring back to FIG. 6, the quantized data (DCT data) from the quantizer 4 is sub,plied to an outer code circuit 5. The outer code circuit 5 acids a burst error correction code to the quantized data from the quantizer 4 and writes the quantized data added with the burst error correction code in a field memory 7 on the basis of a write address signal from a write address counter 6. The quantized data written in the field memory 7 is sequentially read out therefrom on the basis of an address signal that is output from a ROM (read only memory) 9 in response to a count value from a read address counter 8.

Figure 8:
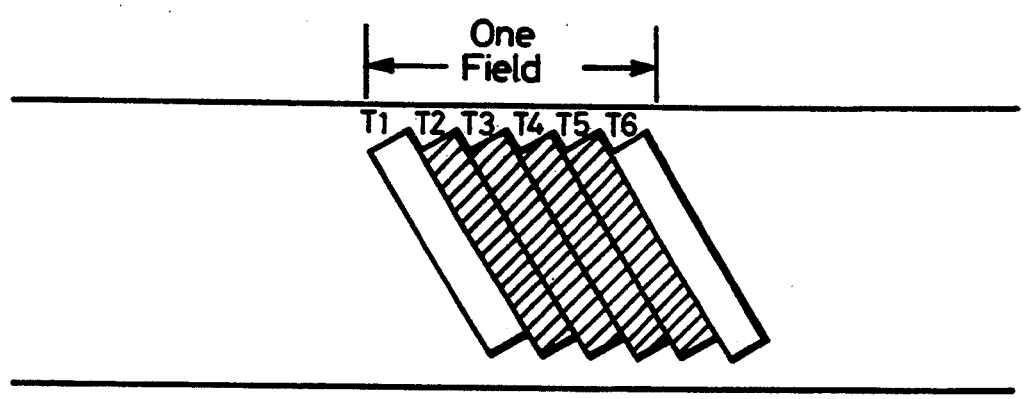
FIG. 8 is a diagram used to explain the condition that quantized data is written on the magnetic tape.

Operation that the quantized data is written on a magnetic tape 14 on the basis of the address signal from the ROM 9 will be described with reference to FIG. 8. FIG. 8 shows an example of video tracks T1, T2, T3, .

..., T6 formed when a signal of one field, for example, is recorded.

In the video tracks T1 to T6, the video track T6, not hatched, is a video track that has the possibility that, when the tracking is displaced forwardly upon editing, original data will be destroyed. Similarly, the video track T1, not hatched, is a video track that has the possibility that, when the tracking is displaced backwardly upon editing, original data will be destroyed.

In this embodiment, when the video tracks T1 to T6 are sequentially formed by sequentially recording the signals, a high frequency component of data is recorded on the video tracks t1 and T6 (not hatched in FIG. 8) that have the large possibility that original recording data will be destroyed upon editing. Also, a low frequency component of data is recorded on the video tracks T2 to T5 (shown hatched in FIG. 8) that have little possibility that original data will be destroyed upon editing, thereby the recording of one field being effected.

As earlier noted, a high frequency component of data is less affected visually and a low frequency component of data is considerably affected visually. If the quantized data is processed in an inverse transform fashion and reconverted into the original video signal when the original recording data on the video tracks T1 and T6 are destroyed during the edit of other field by the mis-tracking upon editing so that an error occurs in the quantized data, an amount that a high frequency component of data is deteriorated in picture quality by the resultant error is comparatively small and the deteriorated picture quality can be corrected relatively easily. Whereas, if a low frequency component of data is considerably deteriorated in picture quality then the deteriorated picture quality cannot be corrected with ease.

Of the quantized date, a high frequency component of data is recorded on the video tracks T1 and T6 that have the large possibility that the original recording data will be destroyed upon editing and a low frequency component of data is recorded on the tracks T2 to T5 that have less possibility that the original data will be destroyed upon editing. Therefore, even when the original data is destroyed by the mis-tracking upon editing with the result that a playback error occurs, the playback error occurs only in a high frequency component of data. Thus, image data can be prevented from being affected visually.

More specifically, the ROM 9 outputs an address signal of an area in which a high frequency component of data of the data stored in the field memory 7 is recorded in synchronism with the timing at which the video tracks are formed by recording the signal by the recording head 13 in response to the count value from the read address counter 8 and outputs an address signal of an area in which a Low frequency component of data of the data stored in the field memory 7 is stored at the timings of the video tracks T2 to T5, as shown in FIG. 8.

Data are sequentially read out from the field memory 7 in response to the address signal from the ROM 9 from a high frequency component of data to a low frequency component of data. The quantized data thus read is supplied to a coding circuit 10.

U.S. Pat. No. 4,882,732 describes in detail a position at which the outer code is recorded. According to U.S. Pat. No. 4,882,732, the outer code is recorded on the magnetic tape at its portion near the tape edge, thereby suppressing the occurrence of error in the video data as much as possible.

Figure 9:
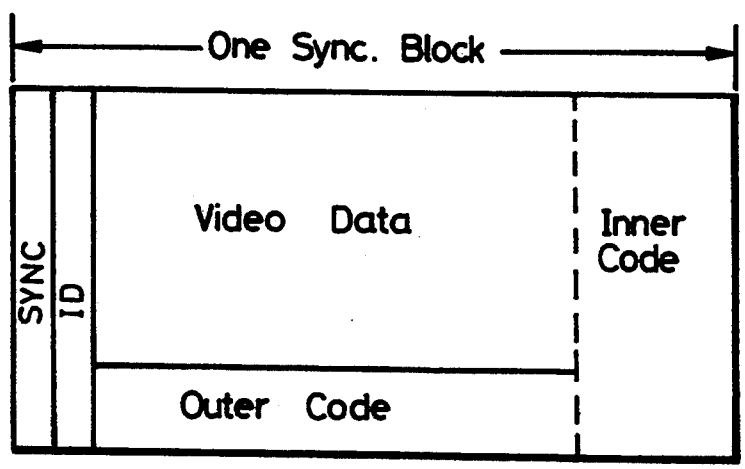
FIG. 9 is a diagram used to explain an arrangement of an error correction code block.

The coding circuit 10 in this invention processes the quantized data added with the outer code data from the field memory 7 in various code processing fashions in order to correct and detect a playback error upon playback. FIG. 9 shows an example of a format of a correction code block that results from the above code processing.

Referring to FIG. 9, there is shown one correction code block which comprises a sync. (synchronizing) code, an ID (identification) code, video data, an outer code and an inner code. The inner code is a correction code that is used to correct consecutive data within the sync. block and which is continuously recorded on the magnetic tape 14 as data. The inner code is mainly utilized to correct a random error. The outer code is a correction code that is used to correct discrete data of each sync. block. The outer code is recorded on the magnetic tape 14 at its portion distant from the portion where data is recorded and is mainly utilized to correct a burst error. This error correction code is data that is affected a little when an error occurs. More specifically, even when the error correction code is destroyed, if there remains video data normally, then the video signal can be reproduced without trouble. In particular, the outer code shown in FIG. 9 constructs a sync. block different from the video data and can be recorded at a proper position on the video track.

According to a second embodiment of the present invention, with reference to FIG. 8, when the respective video tracks T1 to T6 are formed in that order by sequentially recording the signals, the outer code that is affected relatively a little when an error occurs is recorded on the video tracks T1 and T6 (shown not hatched in FIG. 8) that have the large possibility that the original recording data will be destroyed by the mis-tracking upon editing.

The outer code is affected relatively a little when an error occurs as described above. As shown in FIG. 8, this outer code is recorded on the video tracks T1 and T6 that have the large possibility that the original data will be destroyed by the mis-tracking upon editing so that, even when the recorded data recorded on the track T1 or T6 is destroyed by the mis-tracking upon editing and the playback error occurs, the deterioration of the reproduced video signal due to the playback error can be suppressed.

As described above, the ROM 9 (FIG. 6) outputs the address signal of the area in which the outer code in the data stored in the field memory 7 is stored at the timings in which the video tracks T1 and T6 are formed in synchronism with the timing at which the video track is formed by recording the signal by the recording head 13 in response to the count value from the read address counter 8.

The outer code is sequentially read out from the field memory 7 in response to the address signal from the ROM 9 and the address signal thus read is supplied to the coding circuit 10.

Referring back to FIG. 6, the quantized data and the burst error correction outer code supplied to the coding circuit 10 are added with the random error correction code, the sync. code, the ID code or the like, converted from an 8-bit parallel signal to a one-bit serial signal having a clock frequency 8 times as high as the frequency of the 8-bit parallel signal and then supplied to a recording circuit 11. This recording circuit 11 supplies a recording current through a rotary transformer 12 to the recording head 13 mounted on the rotary drum (not shown) in response to the signal from the coding circuit 10, thereby recording the recording signal on the magnetic tape 14.

Operation that the magnetic tape 14 on which the recording signal is recorded is edited and the magnetic tape 14 thus edited is reproduced will be described below. The recording signal that is recorded on the magnetic tape 14 so as to form the oblique video tracks is sequentially reproduced to the video tracks T1 to T6 by the playback head 15. At that time, a high frequency component of video data or outer code is recorded on the video tracks T1 and T6 and a low frequency component of data is recorded on the video tracks T2 to T5 so that, even when the original recorded data (recorded data on the video tracks T1 and T6) is destroyed by the mis-matching upon editing and the playback error occurs, the picture quality can be prevented from being destroyed visually because a high frequency component of data that is less affected visually or outer code is recorded on the video tracks T1 and T6 that have the large possibility that the original recorded data will be destroyed by the mis-tracking (in the forward and backward directions) upon editing.

A reproduced signal that is reproduced by the playback head 15 (the recording head is also served as the reproducing head and vice versa) is supplied through a rotary transformer 16 to a playback equalizer 17. The reproduced signal thus equalized in waveform by the playback equalizer 17 is supplied to a PLL (phase-locked loop) circuit 18. The PLL circuit 18 reproduces one-bit serial data on the basis of the reproduced signal from the playback equalizer 17. Then, the reproduced signal from the PLL circuit 18 is supplied to a sync. detector circuit 19.

The sync. detector circuit 19 reproduces a block sync. signal to convert the one-bit serial data from the PLL circuit 18 into 8-bit parallel data having a $\frac{1}{8}$-times clock frequency. The 8-bit parallel data is supplied to an inner code correcting circuit 20. The inner code correcting circuit 20 corrects a random error by using the 8-bit parallel data from the sync. detector circuit 19 and supplies the 8-bit parallel data thus corrected in random error to an ID decoder 21 and the field memory 22.

The ID decoder 21 decodes the above ID code and generates an address signal on the basis of the ID code thus decoded. This address signal is supplied to a field memory 22 so that the quantized data and the outer code are written in the field memory 22.

As shown in FIG. 6, a video sync. signal is supplied to an input terminal 23. The video sync. signal applied to the input terminal 23 is supplied to a read address counter 24. The read address counter 24 generates a read address signal on the basis of the video sync. signal supplied to the input terminal 23. The read address signal thus read is supplied to the above field memory 22. The quantized data and the outer code written in the field memory 22 are read out therefrom and the quantized data and outer code thus read are supplied to an outer code correcting circuit 25.

The outer code correcting circuit 25 corrects a burst error of the quantized data similarly supplied from the field memory 22 by using the outer code supplied thereto from the field memory 22. The quantized data in which the burst error was corrected is supplied to an inverse DCT circuit 26.

The inverse DCT circuit 26 converts the quantized data from the outer code correcting circuit 25 into the transform coefficient, converts the transform coefficient into original image data and supplies the original image data to an error correction circuit 27. The error correcting circuit 27 corrects an error of the image data from the inverse DCT circuit 26 and outputs the error-corrected video signal from an output terminal 28 as a reproduced video signal. The reproduced video signal is supplied through the output terminal 28 to a monitor (not shown) or the like, thereby being displayed on a picture screen of the monitor as a reproduced picture.

Figure 10:
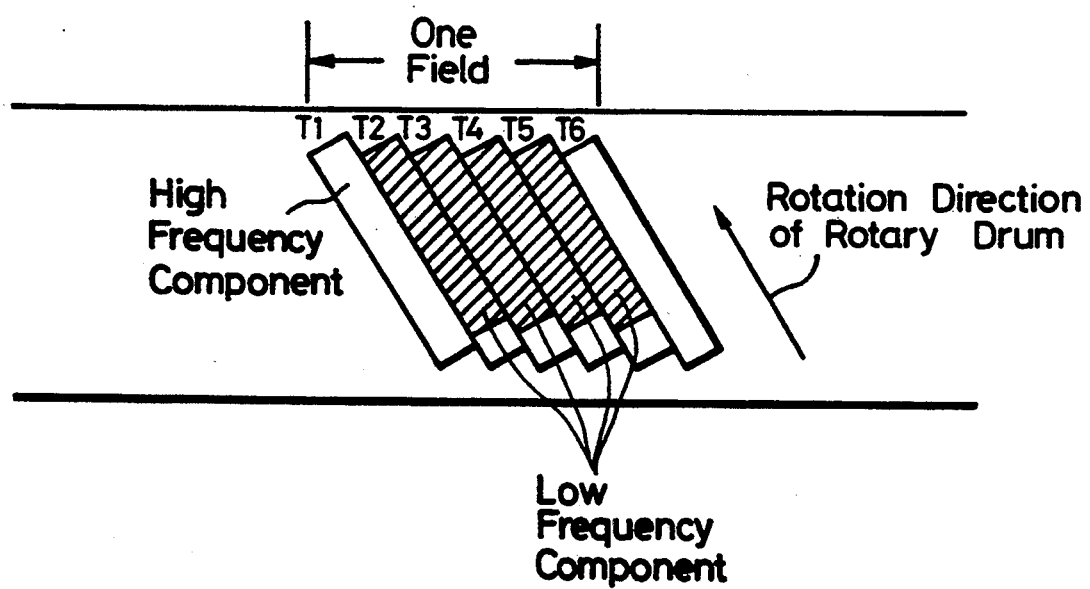
FIG. 10 is a diagram showing a tape format according to another embodiment of the present invention.

As a third embodiment of the present invention, there can be considered such a data format as shown in FIG. 10. Either of or both of a relatively high frequency component of data included in image informations thus processed in a DCT fashion and the outer code data are recorded on the first and last video tracks T1, T6 and head contact-starting portions (portions that are not shown by hatched portions of the video tracks T2 to T5 in FIG. 10) of the video tracks T2, T3, T4 and T5. This data format is effective in order to prevent the occurrence of error because a spacing loss between the head and the tape is large in the head contact portions and therefore an error tends to occur when digital data is reproduced.

As described above, according to this embodiment, when the video signal is recorded on the magnetic tape 14, a high frequency component of data in the recording signal that is affected a little visually or the outer code that is less affected when an error occurs is recorded on the video tracks T1 and T6 that have the large possibility that the original recorded data will be destroyed by the mis-tracking upon editing and a low frequency component of data which is considerably affected visually, i.e., whose picture quality is deteriorated considerably visually is recorded on the video tracks T2 to T5 that have the small possibility that the original recorded data will be destroyed by the mis-tracking upon editing. Therefore, even when the tracking is displaced in the forward or backward direction upon editing and the original recorded data (recorded on the video tracks T1, T6) is destroyed so that the playback error occurs and is increased, then the deterioration of the image quality due to the error can be reduced considerably.

While the video signal is recorded on the magnetic tape 14 as described above, the present invention is not limited thereto and may be applied to the case that an audio signal and other various informations are recorded on the magnetic tape 14.

According to the present invention, since an information is recorded on a recording medium while the mis-tracking upon editing is taken into consideration, even when an edit point is displaced by the mis-tracking upon editing and an error occurs, an amount that the picture quality of the reproduced picture is deteriorated when the error occurs can be reduced considerably.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. Apparatus for recording a digital video signal, comprising:

means for receiving a digital video signal comprised of successive fields;

means for orthogonally transforming each field of said digital video signal to produce a transformed signal;

means for quantizing said transformed signal to produce a quantized signal having a low frequency component and a high frequency component;

means for arranging said quantized signal in a predetermined format for recording, said format including beginning and ending portions containing substantially only said high frequency component of said quantized signal and a middle portion between said beginning and ending portions and containing substantially only said low frequency component of said quantized signal; and means for recording said high frequency component of said quantized signal for each said field substantially only in beginning and ending tracks of a plurality of tracks on a magnetic tape and said low frequency component of said quantized signal for each said field substantially only in middle tracks of said plurality of tracks disposed between said beginning and ending tracks on said magnetic tape.

2. The apparatus of claim 1, wherein said beginning and ending tracks are first and last tracks, respectively, of said plurality of tracks.

3. The apparatus of claim 1, wherein said means for orthogonally transforming is a discrete cosine transformer.

4. The apparatus of claim 1, wherein said plurality of tracks include six tracks for each said field.

5. The apparatus of claim 1, further comprising means for adding an error code signal to said quantized signal.

6. The apparatus of claim 5, wherein said means for recording records said error code signal substantially only in said beginning and ending tracks of said plurality of tracks on said magnetic tape.

7. The apparatus of claim 6, wherein said means for recording further records at least one of said error code signal and said high frequency component of said quantized signal substantially only at beginning portions of each of said middle tracks.

8. The apparatus of claim 1, wherein said means for arranging includes a memory having addresses for storing said quantized signal, and a write address counter and a read address counter for controlling write addresses and read addresses, respectively, of said memory.

9. The apparatus of claim 8, wherein said read address counter includes a read only memory (ROM).

10. Apparatus for recording and reproducing a digital video signal, comprising:

means for receiving a digital video signal comprised of successive fields;

means for orthogonally transforming each field of said digital video signal to produce a transformed signal;

means for quantizing said transformed signal to produce a quantized signal having a low frequency component and a high frequency component;

means for adding an error code signal to said quantized signal;

means for arranging said quantized signal in a predetermined format for recording, said format including beginning and ending portions containing substantially only said high frequency component of said quantized signal and a middle portion between said beginning and ending portions and containing substantially only said low frequency component of said quantized signal;

means for recording said high frequency component of said quantized signal for each said field substantially only in beginning and ending tracks of a plurality of tracks on a magnetic tape and said low frequency component of said quantized signal for each said field substantially only in middle tracks of said plurality of tracks disposed between said beginning and ending tracks on said magnetic tape;

means for recording said error code signal in at least some of said plurality of tracks;

means for reproducing said high and low frequency components of said quantized signal and said error code signal from said magnetic tape;

means for equalizing the reproduced quantized signal and error code signal to produce equalized signals;

means for reproducing one-bit serial data from said equalized signals;

means for converting said one-bit serial data to 8-bit parallel data;

means for correcting a random error of said 8-bit parallel data to produce corrected parallel data representing the reproduced quantized signal and reproduced error code signal;

means for decoding said corrected parallel data to produce a write address signal;

means for receiving a read address signal;

means for storing said corrected parallel data in accordance with said write address signal and for supplying a stored quantized signal and a stored error code signal as an output in accordance with said read address signal;

means for correcting a burst error of said stored quantized signal in accordance with said stored error code signal to produce a corrected quantized signal;

means for inverse-orthogonal transforming said corrected quantized signal to produce an inverse-transformed digital video signal; and means for correcting an error of said inverse-transformed digital video signal and supplying a corrected signal as an output.

11. The apparatus of claim 10, wherein said beginning and ending tracks are first and last tracks, respectively, of said plurality of tracks.

12. The apparatus of claim 11, wherein said means for recording said error code signal records the latter substantially only in said first and last tracks of said plurality of tracks on said magnetic tape.

13. The apparatus of claim 10, wherein said means for arranging includes a memory having addresses for storing said quantized signal, and a write address counter and a read address counter for controlling write addresses and read addresses, respectively, of said memory.

14. The apparatus of claim 13, wherein said read address counter includes a read only memory (ROM).

15. The apparatus of claim 10, wherein said means for storing is a buffer memory.

16. The apparatus of claim 10, wherein said means for orthogonally transforming is a discrete cosine transformer.

17. The apparatus of claim 10, wherein said means for reproducing one-bit serial data is a phase-locked loop (PLL) circuit.

18. The apparatus of claim 10, wherein said means for converting is a synchronizing detector.

19. The apparatus of claim 10 wherein said means for inverse-orthogonal transforming is an inverse discrete cosine transform (DCT$^{-1}$) circuit.

20. Method of recording a digital video signal, comprising the steps of:

receiving a digital video signal comprised of successive fields;

orthogonally transforming each field of said digital video signal to produce a transformed signal;

quantizing said transformed signal to produce a quantized signal having a low frequency component and a high frequency component;

arranging said quantized signal in a predetermined format for recording, said format including beginning and ending portions containing substantially only said high frequency component of said quantized signal and a middle portion between said beginning and ending portions and containing substantially only said low frequency component of said quantized signal; and recording said high frequency component of said quantized signal for each said field substantially only in beginning and ending tracks of a plurality of tracks on a magnetic tape and said low frequency component of said quantized signal for each said field substantially in middle tracks of said plurality of tracks disposed between said beginning and ending tracks on said magnetic tape.

21. The method of claim 20, wherein said beginning and ending tracks are first and last tracks, respectively, of said plurality of tracks.

22. The method of claim 20, wherein said step of orthogonally transforming is carried out by discrete cosine transforming said digital video signal to produce said transformed signal.

23. The method of claim 20, wherein said plurality of tracks include six tracks for each said field.

24. The method of claim 20, further comprising the step of adding an error code signal to said quantized signal.

25. The method of claim 24, wherein said step of recording is carried out by recording said error code signal substantially only in said beginning and ending tracks of said plurality of tracks on said magnetic tape.

26. The method of claim 25, wherein said step of recording is carried out by recording at least one of said error code signal and said high frequency component of said quantized signal substantially only at beginning portions of each of said middle tracks.

* * * * *